United States Patent
Kim et al.

(10) Patent No.: US 11,287,855 B2
(45) Date of Patent: Mar. 29, 2022

(54) CONNECTOR MODULE AND ELECTRONIC DEVICE COMPRISING SAME

(71) Applicant: Samsung Electronics Co., Ltd., Gyeonggi-do (KR)

(72) Inventors: Byung Sik Kim, Gyeonggi-do (KR); Young Gwon Koo, Gyeonggi-do (KR); Seung Woon Lee, Gyeonggi-do (KR); Jin Gyu Choi, Gyeonggi-do (KR)

(73) Assignee: Samsung Electronics Co., LTD., Suwon-si (KR)

( * ) Notice: Subject to any disclaimer, the term of this patent is extended or adjusted under 35 U.S.C. 154(b) by 139 days.

(21) Appl. No.: 16/763,632

(22) PCT Filed: Oct. 25, 2018

(86) PCT No.: PCT/KR2018/012719
§ 371 (c)(1),
(2) Date: May 13, 2020

(87) PCT Pub. No.: WO2019/098559
PCT Pub. Date: May 23, 2019

(65) Prior Publication Data
US 2020/0278724 A1    Sep. 3, 2020

(30) Foreign Application Priority Data
Nov. 14, 2017    (KR) ........................ 10-2017-0151764

(51) Int. Cl.
*G06F 1/16* (2006.01)
*H01R 12/79* (2011.01)
*H01R 12/88* (2011.01)

(52) U.S. Cl.
CPC .......... *G06F 1/1683* (2013.01); *G06F 1/1656* (2013.01); *G06F 1/1681* (2013.01); *H01R 12/79* (2013.01); *H01R 12/88* (2013.01)

(58) Field of Classification Search
CPC .... G06F 1/1616; G06F 1/1681; G06F 1/1683; G06F 1/1684; H01R 12/77
See application file for complete search history.

(56) References Cited

U.S. PATENT DOCUMENTS

2003/0095390 A1    5/2003    Kim
2004/0266239 A1    12/2004    Kurokawa
(Continued)

FOREIGN PATENT DOCUMENTS

KR    2003-0040886 A    5/2003
KR    10-2005-0001342 A    1/2005
(Continued)

*Primary Examiner* — Anthony Q Edwards
(74) *Attorney, Agent, or Firm* — Cha & Reiter, LLC.

(57) ABSTRACT

An electronic device according to various embodiments of the present invention may comprise: a body portion comprising a first surface facing in a first direction, a second surface facing in a second direction that is opposite to the first direction, and a seating groove arranged in an inner peripheral area thereof in the longitudinal direction; a display portion rotatably coupled to the body portion; and a connector module arranged in the seating groove of the body portion so as to provide electric coupling between the body portion and the display portion, at least a part of the connector module being configured to rotate. The connector module may comprise: a support portion fixed/coupled inside the seating groove, the support portion comprising an opening arranged therein; a link portion rotatably coupled to the support portion, the center area of the link portion being open so as to correspond to the opening of the support portion; at least one elastic member arranged between the support portion and the link portion so as to provide elastic restoration power caused by rotation of the link portion; and at least one cable connected from the body portion to the (Continued)

display portion through the opening of the link portion, the cable being folded or unfolded by rotation of the link portion.

15 Claims, 7 Drawing Sheets

(56) References Cited

U.S. PATENT DOCUMENTS

| | | | |
|---|---|---|---|
| 2009/0310287 A1 | 12/2009 | Dai et al. | |
| 2013/0076591 A1* | 3/2013 | Sirpal | G06F 1/1649 345/1.3 |
| 2017/0010637 A1 | 1/2017 | Garelli et al. | |
| 2017/0255235 A1 | 9/2017 | Wu et al. | |
| 2020/0348745 A1* | 11/2020 | Hamlin | G06F 1/1647 |
| 2021/0103317 A1* | 4/2021 | Raju | G06F 1/203 |
| 2021/0204428 A1* | 7/2021 | Kim | H01L 51/5237 |

FOREIGN PATENT DOCUMENTS

| | | |
|---|---|---|
| KR | 10-2006-0005063 A | 1/2006 |
| KR | 10-2013-0138047 A | 12/2013 |

\* cited by examiner

CONNECTOR MODULE AND ELECTRONIC DEVICE COMPRISING SAME

CROSS-REFERENCE TO RELATED APPLICATIONS

This application is a National Phase Entry of PCT international Application No. PCT/KR2018/012719, which was filed on Oct. 25, 2018, and claims priority to Korean Patent Application No. 10-2017-0151764 filed on Nov. 14, 2017, in the Korean Intellectual Property Office, the contents of which are incorporated herein by reference.

TECHNICAL FIELD

The disclosure relates to a connector module and an electronic device including the same.

BACKGROUND ART

Electronic devices may refer to devices, such as electronic notes, portable multimedia players, mobile communication terminals, tablet PCs, image/sound devices, desktop/laptop computers, and vehicular navigation systems, including home appliances, which perform specific functions according to mounted programs. For example, the electronic device may output stored information through sounds or images. With the increase of the degree of integration and the popularization of hyper-speed and high-capacity wireless communication, recently, one electronic device such as a mobile communication terminal has various functions. For example, in addition to a communication function, an entertainment function such as a game, a multimedia function such as playback of music/videos, a communication/security function for mobile banking, and functions such as schedule management or an electronic wallet are integrated in one electronic device.

An input device-based body part, a display device-based display part, and a connection structure in various coupling schemes for electrical connection of the body part and the display part are applied to an electronic device. The connection structure may be classified into a rotary type, a sliding type, and a swing type. The rotary structure is easily manufactured, breakdowns are few, and use is convenient, and thus it is widely applied to electronic devices.

DETAILED DESCRIPTION OF THE INVENTION

Technical Problem

The connection structure of the body part and the display part used in the electronic device is a structure that uses a coaxial cable or a wire cable, and the electronic device is restrictively miniaturized and slimmed because the radius of the cable is restrictively reduced. Further, because the cable should extend to a location at which the connection structure is mounted, an additional mounting space due to an increase of the length of the cable may be required.

The disclosure provides a connector module and an electronic device by which the thickness of a cable can be reduced by using a flexible printed circuit board (FPCB) for a connector structure of a body part and a display part.

The disclosure provides a connector module and an electronic device by which damage to or short-circuit of a flexible printed circuit board can be substantially prevented by configuring a connection structure of a body part and a display part such that the flexible printed circuit board can be smoothly folded and unfolded.

Technical Solution

In accordance with an aspect of the disclosure, an electronic device may include: a body part including a first surface facing a first direction and a second surface facing a second direction that is opposite to the first direction, and including a seating recess disposed in an inner peripheral area in a lengthwise direction thereof; a display part coupled to the body part to be rotatable; and a connector module disposed in the seating recess of the body part and electrically coupling the body part and the display part, wherein the connector module includes: a support part fixedly coupled to an inside of the seating recess and including an opening disposed on the inside thereof; a link part coupled to the support part to be rotatable and a central area of which is opened to correspond to the opening of the support part; at least one elastic member disposed between the support part and the link part and configured to provide an elastic restoring force as the link part is rotated; and at least one cable passing from the body part through the opening of the link part to be connected to the display part and folded or unfolded as the link part is rotated.

In accordance with another aspect of the disclosure, a connector module, which provides electrical coupling of a body part and a display part of an electronic device, may include: a support part seated in a seating recess recessed on the inside of the body part; a link part coupled to the support part to be rotatable and a central area of which is opened to correspond to the opening of the support part; at least one elastic member disposed between the support part and the link part and configured to provide an elastic restoring force as the link part is rotated; and at least one cable passing from the body part through the opening of the link part to be connected to the display part and folded or unfolded as the link part is rotated, wherein the link part includes a first pole, a second pole disposed to be spaced apart from the first pole, and the opening between the first pole and the second pole, and the at least one cable passes by an upper side of the first pole to pass through the opening and passes by a lower side of the second pole to extend.

Advantageous Effects

According to various embodiments of the disclosure, a mounting space can be reduced and an electronic device can be slimmed and miniaturized by using a flexible printed circuit board (FPCB) for a connector module that electrically connects a body part and a display part that constitutes the electronic device.

According to various embodiments of the disclosure, a mounting space usability can be increased as a flexible printed circuit board (FPCB) of a connector module is folded and/or unfolded in correspondence to rotation of a display part with respect to a body part.

According to various embodiments of the disclosure, damage to or short-circuit of a printed circuit board that varies according to a link structure of a connector module, which is rotated in correspondence to rotation of a display part with respect to a body part, can be prevented and reliability can be provided by realizing the link structure.

MODE FOR CARRYING OUT THE INVENTION

Figure 1:
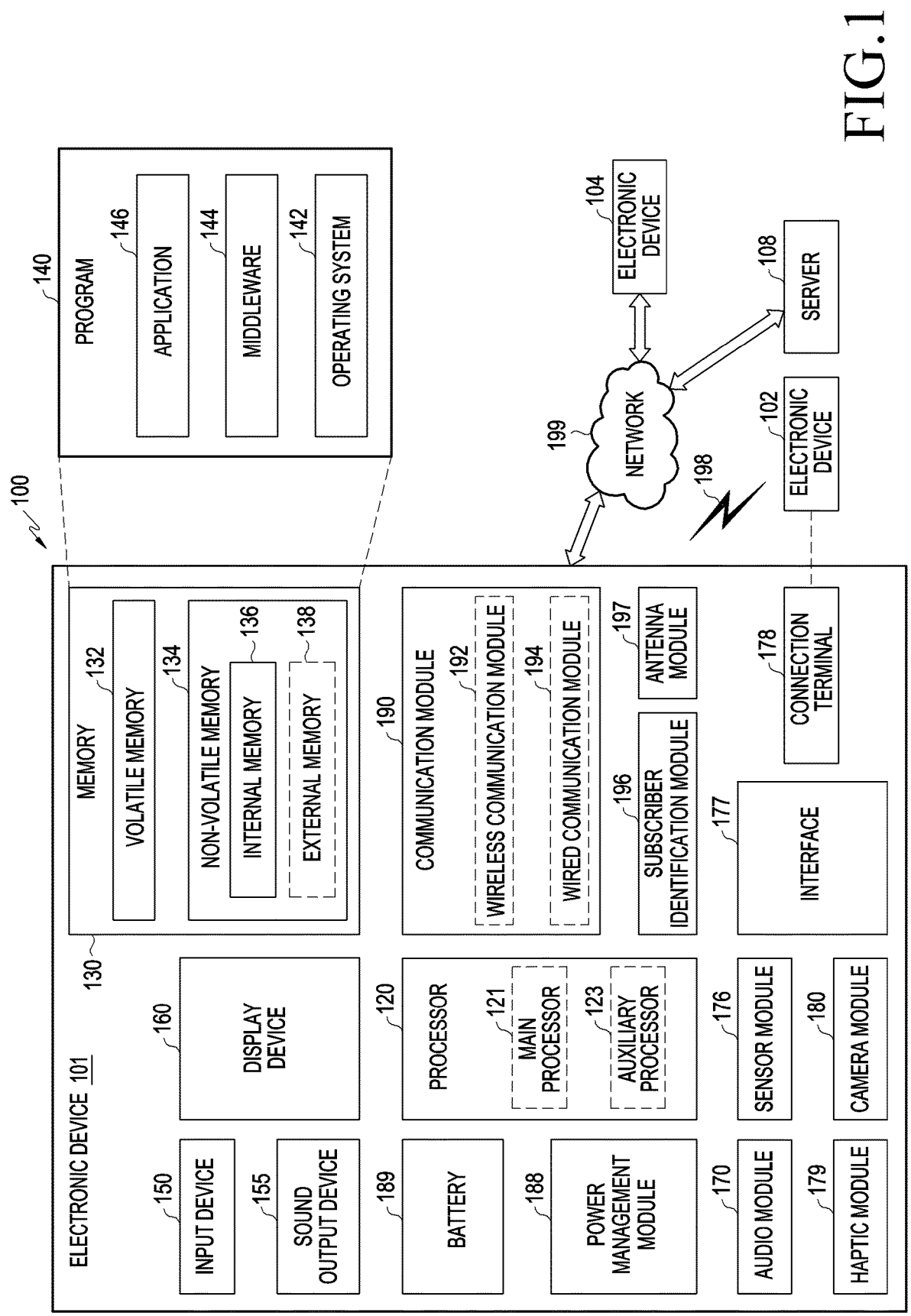
FIG. 1 is a block diagram of an electronic device 101 in a network environment 100 according to various embodiments of the disclosure.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular expression may include plural expressions, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. Expressions such as "first," "second," "primarily," or "secondary," used herein may represent various elements regardless of order or importance and do not limit corresponding elements. When it is described that an element (such as a first element) is "(operatively or communicatively) coupled with/to" or "connected" to another element (such as a second element), the element can be directly connected to the other element or can be connected to the other element through another element (e.g., a third element).

A term "module" used herein may mean, for example, a unit including hardware, software, or firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140 of FIG. 1) including an instruction that is stored in a machine-readable storage medium (e.g., internal memory 136 or external memory 138 of FIG. 1) that is readable by a machine (e.g., a computer). The machine may invoke the stored instruction from the storage medium and operate according to the invoked instruction, and may include an electronic device (e.g., the electronic device 101 of FIG. 1) according to the disclosed embodiments. When the instruction is executed by a processor (for example, the processor 120 of FIG. 1), the processor may perform functions corresponding to the instruction by itself or by using other components under the control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described sub-components may be omitted, or one or more other sub-components may be added. Alternatively or additionally, some components (e.g., modules or programs) may be integrated into a single entity, and the integrated component may still perform one or more functions of each of some components in the same or similar manner as they are performed by a corresponding one of some components before the integration. Operations performed by the module, the program, or another component according to various embodiments may be carried out sequentially, in parallel, repeatedly, or heuristically, or one or more of the operations may be executed in a different order or omitted, or one or more other operations may be added. Hereinafter, an electronic device according to various embodiments will be described with reference to the accompanying drawings. In the disclosure, the term "user" may refer to a person using an electronic device or a device (e.g., artificial intelligence electronic device) using an electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process and compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU), an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control, for example, at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active (e.g., performing an application) state. According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102 (e.g., a speaker or a headphone)) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., an local area network (LAN) communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)) by using a corresponding communication module. The above-enumerated types of communication modules 190 may be implemented in a single chip, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of the same type as or a different type than the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

Figure 2:
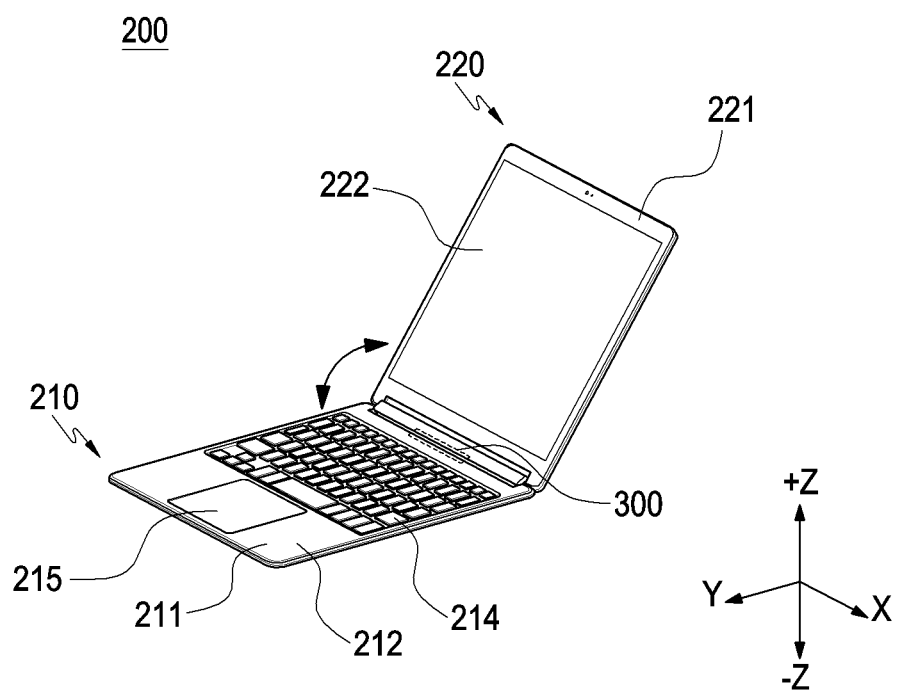
FIG. 2 is a perspective view of a portable electronic device 200 including a connector module 300 according to various embodiments of the disclosure.

FIG. 2 is a perspective view of a portable electronic device 200 including a connector module 300 according to various embodiments of the disclosure.

In FIG. 2, 'X' of a 3-axis Cartesian coordinate system may denote the lengthwise direction of the electronic device 200, 'Y' may denote the widthwise direction of the electronic device 200, and 'Z' may denote the thickness direction of the electronic device 200. In an embodiment of the disclosure, 'Z' may denote a first direction (+Z) and a second direction (−Z).

As illustrated in FIG. 2, the electronic device 200 may include a body part 210, and a display part 220 that may be electrically connected to the body part 210 through a connector module 300 disposed in the body part 210. The connector module 300 has a structure including a configuration that may be rotated in correspondence to rotation of the display part 220 with respect to the body part 210 and the length of which may be adjusted, and may be mounted and disposed in a partial area of the body part 210.

According to various embodiments, the body part 210 may include a data input part 214, and for example, the data input part may be a keypad device that assists an input operation, such as typing, for delivering data to the body part 210. The body part 210 may include a first housing 211 and a plurality of input keys at a portion of an upper surface 212 that faces a first direction (+Z) of the first housing 211, and may further include a touchpad 215 that may replace the function of a mouse. A user may perform an operation of more promptly and conveniently inputting data displayed in the display part 220 or stored by utilizing the data input part 214.

According to an embodiment, the first housing 211 is configured to accommodate various electronic components, and at least a portion of the first housing 211 may be formed of a conductive material. For example, the first housing 211 may include a side wall (e.g., the side wall 213 of FIG. 3) that forms an outer surface of the body party 210, and a portion of the first housing 211, which is exposed to the outside of the body part 210, may be formed of a conductive metallic material. A printed circuit part (e.g., the printed circuit part 218 of FIG. 3) and/or a battery (not illustrated) may be accommodated in the interior of the first housing 211. A processor (e.g., the processor 120 of FIG. 1), a communication module (e.g., the communication module 190 of FIG. 1), various interfaces (e.g., the interface 177 of FIG. 1), and a power management module (e.g., the power management module 188 of FIG. 1) may be mounted on the printed circuit part (e.g., the printed circuit part 218 of FIG. 3) in a form of an integrated circuit chip. As another example, a control circuit (not illustrated) also may include an integrated circuit chip, and may be mounted on the printed circuit part (e.g., the printed circuit part 218 of FIG. 3). For example, the control circuit may be a part of the above-described processor or the communication module. The battery (not illustrated) may be accommodated in the interior of the first housing 211 to secure a power source.

According to various embodiments, the display part 220 may be a device including an image display unit or may be a portable device in which a computing system and an image display unit is integrated in a single device. A data input part, a data output part, and/or a data input/output part may be included in the interior of the display part 220. For example, the data input part may employ an input device such as a touchpad, the data output part may employ a display part such as a display device, and the data input/output part may employ a device such as a touch screen.

According to an embodiment, the display part 220 may include a second housing 221 including a transparent window 222, and a display for displaying external information through the transparent widow 222 may be disposed in the interior of the second housing 221. The second housing 221 is configured to accommodate various electronic components, and at least a portion of the second housing 221 may be formed of a conductive material. For example, the second housing 221 may include a side wall (e.g., the side wall 213 of FIG. 3) that forms an outer surface of the display part 220, and a portion of the first housing 211, which is exposed to the outside of the display part 220, may be formed of a conductive metallic material. A printed circuit part (not illustrated) may be accommodated in the interior of the display part 220. For example, a processor (e.g., the processor 120 of FIG. 1), a communication module (e.g., the communication module 190 of FIG. 1), various interfaces (e.g., the interface 177 of FIG. 1), and a power management module (e.g., the power management module 188 of FIG. 1) may be mounted on the printed circuit part in a form of an integrated circuit chip. As another example, a control circuit (not illustrated) also may include an integrated circuit chip to be mounted on the printed circuit part. For example, the control circuit may be a part of the above-described processor or the communication module. As another example, a camera and sensors such as an illumination sensor or a proximity sensor may be included in an upper end area of a surface of the second housing 221.

According to various embodiments, a connector module 300 for electrical coupling with the display part 220 may be disposed on the upper surface 212 of the body part 210, which faces the first direction (+Z). The connector module 300 may be disposed along the lengthwise direction (+X and −X) of the body part 210. At least a portion (for example, the cable) of the connector module 300 disposed in the body part 210 may be coupled to one end of the display part 220, and the body part 210 and the display part 220 may be electrically connected to each other.

The connector module 300 electrically connected between the body part 210 and the display part 220 will be described in detail below.

Figure 3:
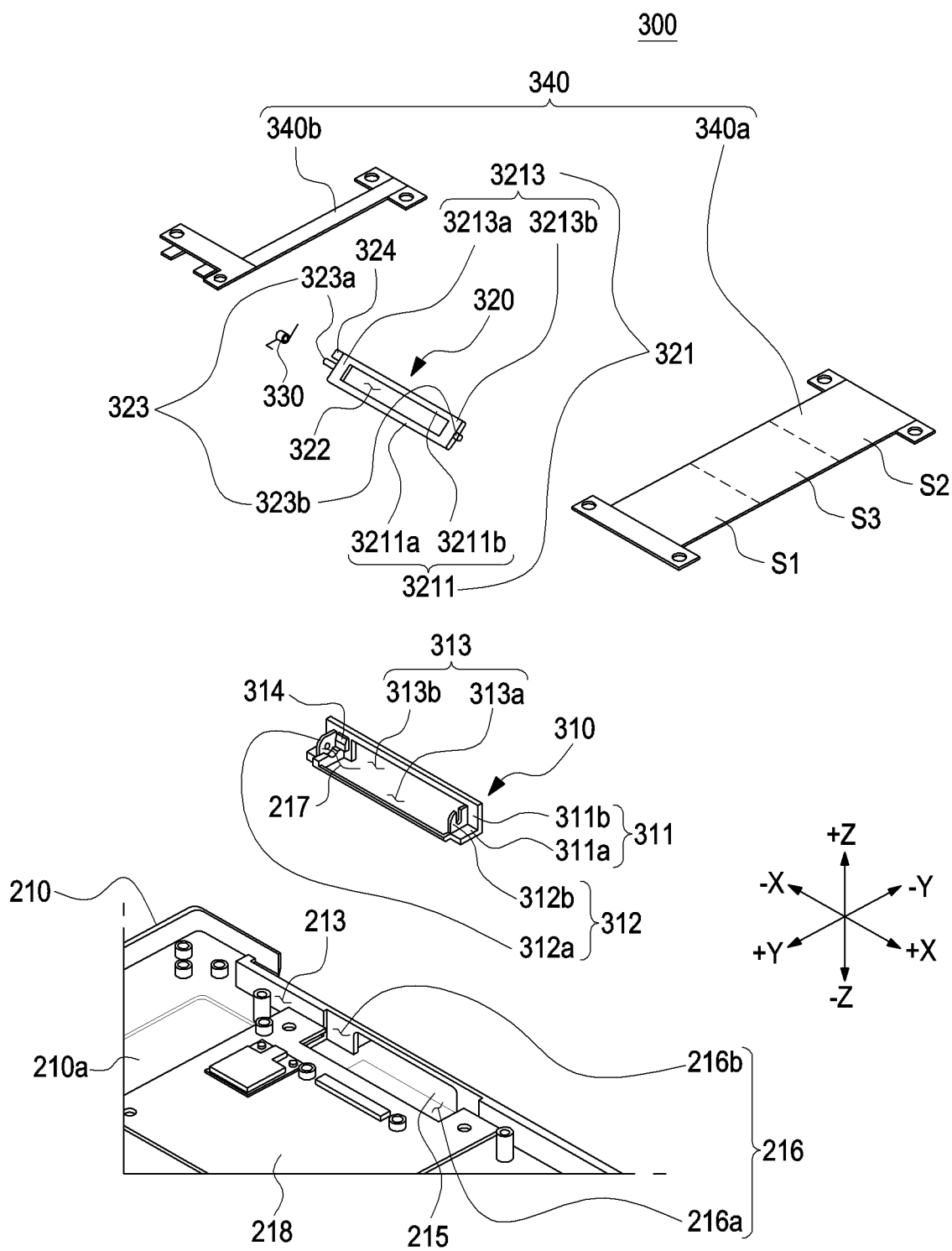
FIG. 3 is an exploded perspective view illustrating components of a connector module 300 according to one of various embodiments of the disclosure.

FIG. 3 is an exploded perspective view illustrating components of a connector module (e.g., the connector module 300 of FIG. 2) according to one of various embodiments of the disclosure. According to one of various embodiments of the disclosure, FIG. 4 is a perspective view illustrating a connector module (e.g., the connector module 300 of FIG. 2) mounted on the body part (e.g., the body part 210 of FIG. 2).

In FIG. 3, 'X' of a 3-axis Cartesian coordinate system may denote the lengthwise direction of the body part 210, 'Y' may denote the widthwise direction of the body part 210, and 'Z' may denote the thickness direction of the body part 210. In an embodiment of the disclosure, 'Z' may denote a first direction (+Z) and a second direction (−Z), 'Y' may denote a third direction (+Y) and a fourth direction (−Y), and 'X' may denote a fifth direction (+X) and a sixth direction (−X).

Figure 4:
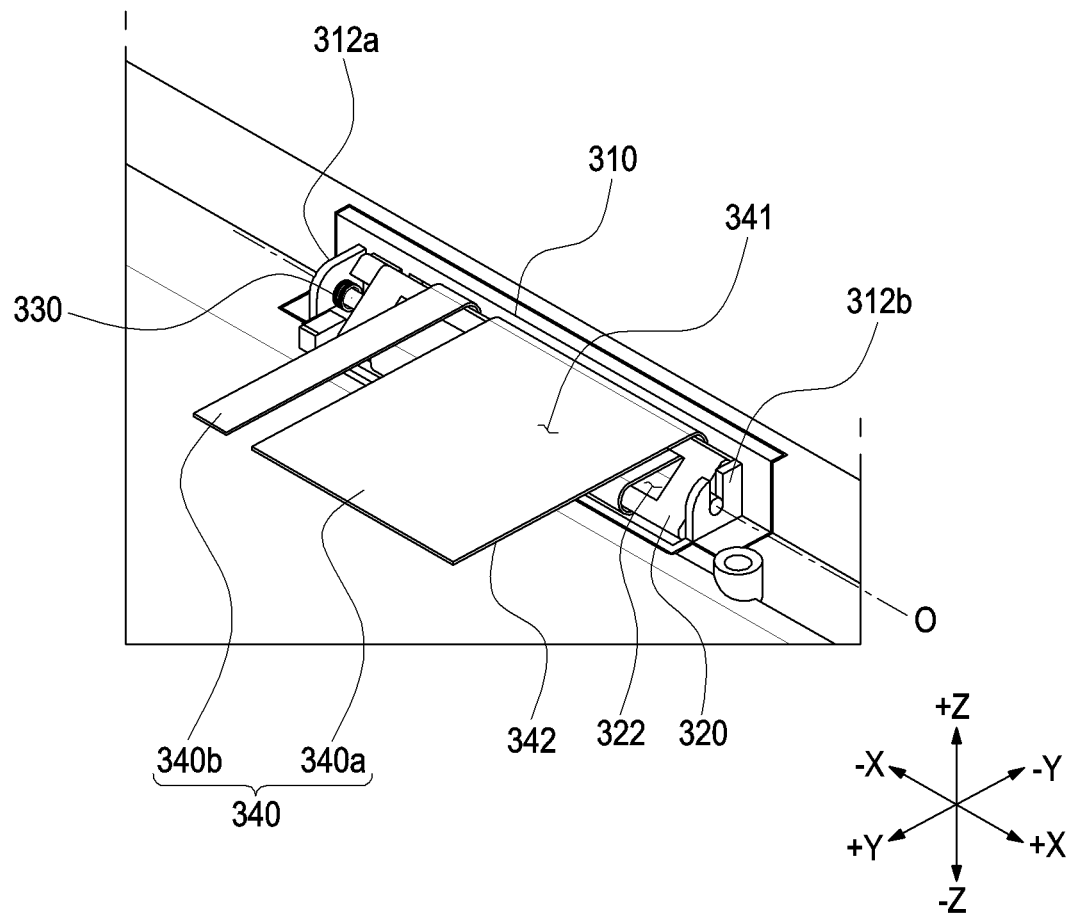
FIG. 4 is a perspective view illustrating a connector module 300 mounted on a body part 210 according to one of various embodiments of the disclosure.

Referring to FIGS. 3 and 4, an electronic device (e.g., the electronic device 200 of FIG. 2) according to one of various embodiments of the disclosure may include a body part 210 and a connector module 300, at least a portion of which is coupled to the body part 210. The connector module 300 may include a support part 310, a link part 320, an elastic member 330, and at least one cable 340.

The structures of the body part 210 and the connector module 300 of FIGS. 3 and 4 may be entirely or partially the same as the structures of the body part 210 and the connector module 300 of FIG. 2.

According to various embodiments, the support part 310 may be disposed in the seating recess 216 disposed in the body part 210, and may fix the connector module 300 to the body part 210 as a whole. For example, a seating recess 216 may be included in a peripheral area of the body part 210. The seating recess 216 may include a first seating surface 216a that is recessed on an inner surface 210a of the first housing 211 toward the second direction (−Z), and a second seating surface 216b that extends from the first seating surface 216a and is recessed in a direction (for example, the fourth direction (−Y)) of a side wall 213 that is perpendicular to the inner surface 210a. The seating recess 216 may be a structure that is recessed in a " ⌐ " shape when viewed along the lengthwise direction (for example, the sixth direction (−X)) of the body part 210, and a support part 310 may be provided in a shape corresponding to the structure to be fixedly seated in the seating recess 216.

According to various embodiments, the support part 310 may include a support portion 311 seated in the seating recess 216, a coupling portion 312 that extends from the support portion 311 and includes at least one hole and/or an opening 313, and an opening 313 disposed at a central area thereof to provide a space, in which the link part 320 is rotated. As another example, the support part 310 may include a stopper 314 that restricts rotation of the link part 320.

According to various embodiments, the support portion 311 may be seated on a peripheral surface of the seating recess 216. The support portion 311 may include a first support portion 311a corresponding to a peripheral area of the first seating surface 216a and a second support portion 311b corresponding to a peripheral area of the second seating surface 216b. The second support portion 311b may extend from the first support portion 311a, and the directions which the first support portion 311a and the second support portion 311b face may be perpendicular to each other. For example, the first support portion 311a may include a surface that faces the first direction (+Z), and the second support portion 311b may include a surface that faces the third direction (+Y).

According to an embodiment, the support portion 311 may be disposed to surround the opening 313, and the thicknesses and/or the lengths of the parts that surround the opening 313 may be different.

According to various embodiments, the opening 313 may be disposed in a central area of the support part 310 and may be coupled to the seating recess 216 to provide an accommodation space 217 in which the link part 320 and the cable 340 are variously moved. For example, the accommodation space 217 may provide a space in which the link part 320 is disposed to be rotatable, and may provide a space that accommodates the cable 340 that is rotated in conjunction with the link part 320.

According to an embodiment, the opening 313 may be opened toward different directions. For example, the opening 313 may include a first opening 313a, at least a portion of which is surrounded by the first support portion 311a and a second opening 313b, at least a portion of which is surrounded by the second support portion 311b. The first opening 313a and the second opening 313b may be connected to each other without any border.

According to an embodiment, the first opening 313a may provide a space in which the link part 320 may be rotated, and a movement path of the cable 340 may be disposed to pass through a lower side of the link part 320. The first opening 313a disposed on the lower side of the support part 310 may be mounted such that the link part 320 and the cable 340 are close to the seating recess 216 of the body part 210 as compared with the first support portion 311a having only a plate shape having no first opening 313a. Accordingly, the electronic device can be slimmed by reducing the thickness of the body part 210 and realizing the structure of the connector module 300 in a minimum space.

According to an embodiment, the second opening 313*b* may be disposed to face a side direction (e.g., the fourth direction (−Y)) of the body part 210, and may provide at least a portion of a passage, in which the at least one cable 340 connected to the link part 320 may be moved to the display part (e.g., the display part 220 of FIG. 2). The second opening 313*b* disposed on the lateral side of the support part 310 may be mounted such that the link part 320 and the cable 340 are close to the seating recess 216 of the body part 210 as compared with the second support portion 311*b* having only a plate shape having no second opening 313*b*. Accordingly, the seating recess 216 of the body part 210 can be prevented from being expanded in a width direction (e.g., the third direction (+Y) and/or the fourth direction (−Y)) thereof, and the electronic device can be slimmed by realizing the structure of the connector module 300 in a minimum space.

According to various embodiments, the coupling portion 312 may be disposed on both sides of the support part 310, and may be coupled to the both ends of the link part 320 to be rotatable. For example, the coupling portion 312 may be manufactured in a shape of a circular hole or an opening obtained by opening one side of the circular hole, and a cylindrical coupling protrusions 323 of the link part 320 may be inserted into the coupling portion 312 such that the coupling portion 312 may be rotated.

According to an embodiment, the coupling portion 312 may extend from surfaces of the first support portion 311*a* and the second support portion 311*b*, and may include a first coupling portion 312*a* and a second coupling portion 312*b* in different forms on both sides of the support part 310. For example, the first coupling portion 312*a* disposed at one end of the support part 310 may be manufactured in a shape in which a plate including at least one hole protrudes from the first support portion 311*a* in the first direction (+Z). As another example, the second coupling portion 312*b* disposed at an both end of the support part 310 may be manufactured in a shape in which a plate including the opening 313 opened in the first direction (+Z) protrudes from the first support portion 311*a* in the first direction (+Z). The first coupling portion 312*a* and the second coupling portion 312*b* may extend from the first support portion 311*a* in the first direction (+Z), and may be disposed to be lower than the height of the second support portion 311*b*.

According to an embodiment, the first and second coupling portions 312*a* and 312*b* disposed in different structures are structures for coupling with the link part 320, and after the coupling protrusions 323 at one end of the link part 320 is inserted into the first coupling portion 312*a* first, the coupling protrusions 323 at an both end of the link part 320 may be fitted with the second coupling portion 312*b* in the second direction (−Z).

According to various embodiments, the stopper 314 may be disposed adjacent to the coupling portion 312, and may restrict rotation of the link part 320. The link part 320 coupled to the support part 310 may be rotated about an imaginary central axis O disposed along the center of the coupling protrusions 323, and may be restricted from being rotated to a predetermined inclination or more by the stopper 314. For example, the stopper 314 may be disposed to contact the first coupling portion 312*a*, and may form an inclined surface that is inclined to the lower side (the second direction (−Z)) as it goes toward the fourth direction (−Y). The angle of the inclined surface may be set by an allowable degree of rotation of the link part 320 corresponding to the rotation of the display part (e.g., the display part 220 of FIG. 2). According to another embodiment, a recess area, in which the elastic member 330 is disposed, may be disposed in an area that is adjacent to the stopper 314.

According to various embodiments, the link part 320 may be coupled to be rotatable about the central axis O in the interior of the support part 310, and may guide the unfolding and folding of the at least one cable 340. The link part 320 may include a rotational portion 321 that contacts at least a portion of the at least one cable 340 and is rotated in the accommodation space 217, an opening 322 disposed inside the rotational portion 321, and coupling protrusions 323 that protrude from both sides of the rotational portion 321.

According to various embodiments, the rotational portion 321 may include a plurality of poles 3211 disposed in parallel to each other such that one surface of the cable 340 may be wound thereon, and a plurality of plates 3213 that connect the plurality of poles 3211. For example, the plurality of poles 3211 may include a first pole 3211*a* and a second pole 3211*b* disposed to be spaced apart from each other, and the first pole 3211*a* and the second pole 3211*b* may be manufactured in a cylindrical shape and at least a portion of the cable 340 may be easily folded or unfolded. The first pole 3211*a* and the second pole 3211*b* may be formed of a metallic material and/or a nonmetallic material (e.g., a polymer), and may include a material having a predetermined frictional force such that at least a portion of the cable 340 may be moved in correspondence to rotations of the first pole 3211*a* and the second pole 3211*b*. According to an embodiment, a surface on which the first pole 3211*a* and the cable 340 contact each other may be different from a surface that contacts the second pole 3211*b*. For example, when a surface of the cable 340 that contacts the first pole 3211*a* is the first surface 341, a surface of the cable 340 that contacts the second pole 3211*b* may be the second surface 342 that faces a direction that is opposite to the first surface 341.

According to an embodiment, the plurality of plates 3213 may extend from both ends of the first pole 3211*a* and the second pole 3211*b*, and may connect the first pole 3211*a* and the second pole 3211*b* to support the first pole 3211*a* and the second pole 3211*b* such that the first pole 3211*a* and the second pole 3211*b* may be rotated in the same direction and at the same radius. For example, the plurality of plate 3213 may include a first plate 3213*a* and a second plate 3213*b* disposed to be spaced apart from each other.

According to various embodiments, an opening 322 may be disposed in a central area of the rotational portion 321 to provide a passage, through which the cable 340 passes. The cable 340 that passes through the opening 322 may be disposed in a state in which partial areas thereof overlap each other in the accommodation space 217, and a large number of cables 340 as compared with a space may be accommodated. As another example, the substantial structure of the rotational portion 321 may have a rectangular shape, the central area of which is opened, and as the link part 320 is rotated, the direction which the opening 322 faces may be changed to the first direction (+Z) to the fourth direction (−Y) via the third direction (+Y).

According to various embodiments, the link part 320 may include coupling protrusions 323 that protrude toward the outside of the plurality of plates 3213. The coupling protrusions 323 may be disposed at both ends of the rotational portion 321, and may be coupled to the coupling portions 312 of the support part 310 to rotate the rotational portion 321. For example, the coupling protrusions 323 that protrude toward the outsides of the first plate 3213*a* and the second plate 3213b disposed to be spaced apart from each other may be manufactured in a cylindrical shape to be inserted into the coupling portions 312 to be rotated. The first coupling protrusion 323a disposed on the first plate 3213a is coupled to pass through the first coupling portion 312a, and the second coupling protrusion 323b disposed on the second plate 3213b may be inserted and fitted toward the opening of the coupling portion 312b. The first coupling protrusion 323a and the second coupling protrusion 323b may function as a central axis O, about which the rotational portion 321 is rotated, and the centers of the first coupling protrusion 323a and the second coupling protrusion 323b may be located on the same line.

According to various embodiments, the link part 320 may include a step 324 that protrudes toward the outside of the plurality of plates 3213. The step 324 may be rotated in correspondence to the rotation of the rotational portion 321, and when the step 324 contacts the inclined surface of the stopper 314, the rotational portion 321 may be interrupted from being rotated to a predetermined inclination or more.

According to various embodiments, the elastic member 330 may be disposed between the support part 310 and the link part 320 to provide an elastic rotational force to the link part 320. For example, the elastic member 330 may be a spring, and may be disposed in a recess area disposed on one side of the stopper 314 in a state in which the elastic member 330 is fitted with the first coupling protrusion 323a of the coupling protrusions 323 of the link part 320.

According to an embodiment, when the electronic device (e.g., the electronic device 200 of FIG. 2) is closed, the link part 320 is rotated by an elastic restoring force whereby at least a portion of the cable 340 disposed in the link part 320 is automatically wound to be mounted in the accommodation space 217. As another example, when the electronic device (e.g., the electronic device 200 of FIG. 2) is opened, a force that rotates the rotated link part 320 in the winding direction by the elastic restoring force may be provided consistently.

According to various embodiments, the central area (e.g., the variable area S3) of the at least one cable 340 may be disposed in the accommodation space 217, and both ends of the at least one cable 340 may be electrically connected to the body part 210 and the display part 220. For example, the at least one cable 340 may include a first area S1 connected to the body part 210, a second area S2 connected to the display part 220, and a variable area S3 disposed between the first area S1 and the second area S2 and that varies in the accommodation space 217 of the body part 210. The variable area S3 may be unfolded by a pulling force by the display part 220 as the display part 220 is rotated with respect to the body part 210.

According to an embodiment, the first area S1 and the second area S2 may be maintained in a state in which the first area S1 and the second area S2 are parallel to one surface of the body part 210 regardless of whether the electronic device (e.g., the electronic device 200 of FIG. 2) is opened or closed. The variable area S3 may form a predetermined inclined surface as a whole in a state in which the electronic device is closed, and may be mounted in a loosened state including at least one curve. The shape of the variable area S3 may vary in an operation of opening the electronic device (e.g., the electronic device 200 of FIG. 2), the variable area S3 may form a predetermined inclined surface in a state in which the electronic device (e.g., the electronic device 200 of FIG. 2) is fully opened, and may be maintained in a flat state except for the border surface of the first area S1 and the second area S2.

According to an embodiment, the at least one cable 340 may be a flexible printed circuit board (PCB), and connectors may be disposed at both ends of the at least one cable 340 to be fixedly coupled to the body part 210 and/or the display part 220. For example, the cable 340 may include a first cable 340a and a second cable 340b. The first cable 340a is connected to the printed circuit part 218 of the body part 210, and may provide a function of delivering an electrical signal of the processor (e.g., the processor 120 of FIG. 1) of the printed circuit part 218, various interfaces (e.g., the interface 177 of FIG. 1), or a power management module (e.g., the power management module 188 of FIG. 1) to the display part 220. The second cable 340b is a part of the communication module (e.g., the communication module 190 of FIG. 1) and for example, may provide a function of an antenna.

According to an embodiment, the at least one cable 340 may extend from the body part 210 to the support part 310 and may extend to the display part 220 through the link part 320. For example, after the first cable 340a inserted into the accommodation space 217 passes through the opening 322 via a lower end of the second pole 3211b of the link part 320, it may be disposed to pass through an upper end of the first pole 3211a of the link part 320. When the first cable 340a is folded to surround a periphery of at least a portion of the link part 320, the accommodation space 217 may accommodate as large area as possible, and partial areas of the first cable 340a are folded not to contact each other whereby damage to the cable can be prevented.

According to an embodiment, areas in which the cable 340 contacts the first pole 3211a and the second pole 3211b of the link part 320 while the cable 340 passes through the opening 322 of the link part 320 may be different surfaces. For example, when the first surface 341 that faces the first direction (+Z) of the cable 340 is disposed to contact the second pole 3211b, the second surface 342 that faces the second direction (−Z) that is opposite to the first direction (+Z) of the cable 340 may be disposed to contact the first pole 3211a. When the electronic device (e.g., the electronic device 200 of FIG. 2) is closed, the cable 340 is disposed to have an "S" shape that is smooth as a whole, and the curve area of the cable 340 may be a marginal part that is used when the electronic device (e.g., the electronic device 200 of FIG. 2) is opened. The marginal part may contact the accommodation space of the connector module 300 or may be accommodated while not being wrinkled.

Figure 5A:
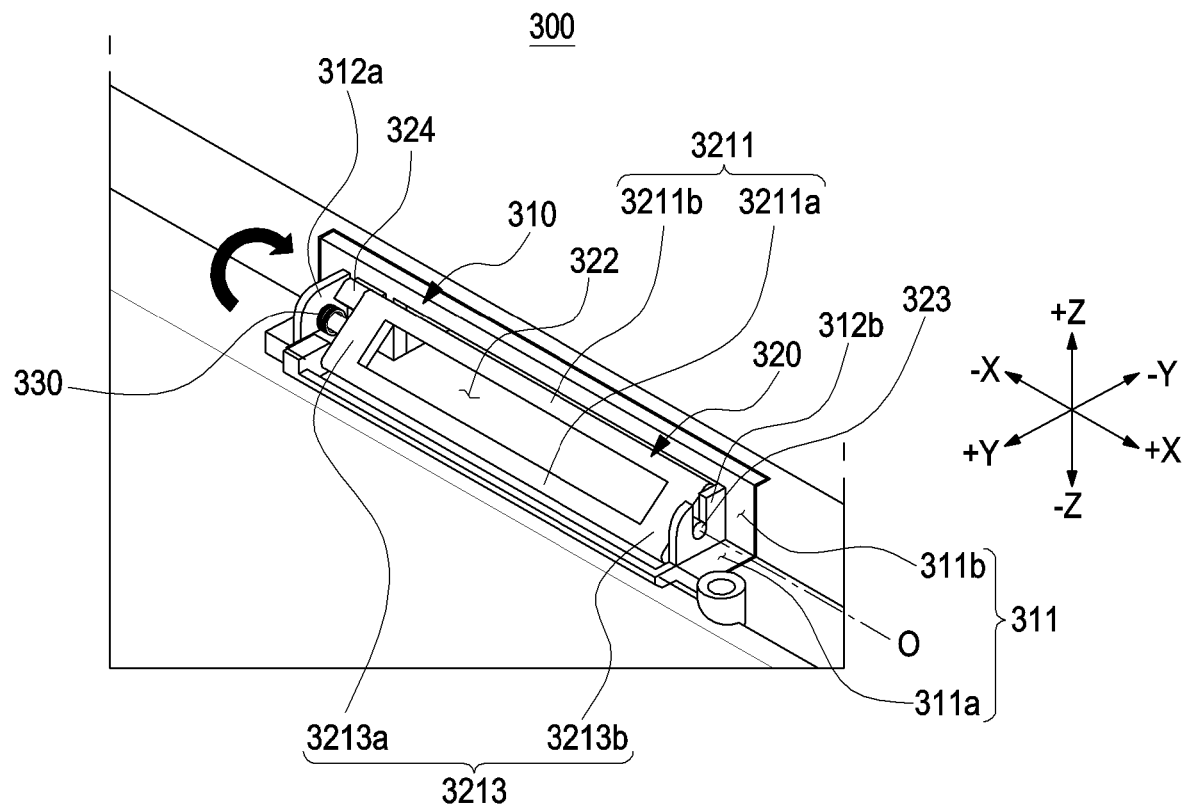
FIG. 5A illustrates a link part 320 that is rotating when a force is provided in a predetermined direction.
Figure 5B:
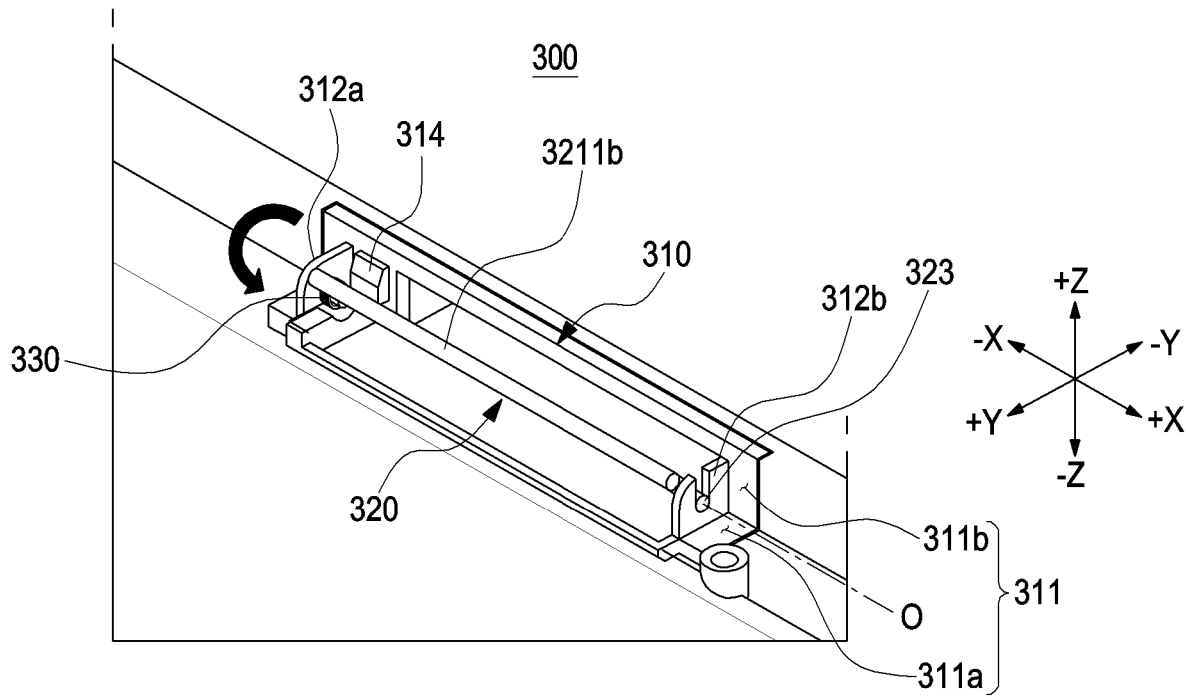
FIG. 5B illustrates the link part 320 that is restored to an original position in a state in which the force is removed.

According to various embodiments of the disclosure, FIGS. 5A and 5B are views illustrating operational states of the connector module 300 disposed in the electronic device. FIG. 5A illustrating a link part 320 that is rotating when a force is provided in a predetermined direction, and FIG. 5B illustrates the link part 320 that is restored to an original position in a state in which the force is removed.

Referring to FIGS. 5A and 5B, the connector module 300 may include a support part 310, a link part 320, and an elastic member 330. The support part 310, the link part 320, and the elastic member 330 of FIGS. 5A and 5B may be partially or entirely the same as the support part 310, the link part 320, and the elastic member 330 of FIGS. 3 and 4.

In FIGS. 5A and 5B, 'X' of a 3-axis Cartesian coordinate system may denote the lengthwise direction of the body part 210, 'Y' may denote the widthwise direction of the body part 210, and 'Z' may denote the thickness direction of the body part 210. In an embodiment of the disclosure, 'Z' may denote a first direction (+Z) and a second direction (−Z), 'Y' may denote a third direction (+Y) and a fourth direction (−Y), and 'X' may denote a fifth direction (+X) and a sixth direction (−X).

According to various embodiments, the connector module 300 may be disposed in the seating recess 216 disposed at a peripheral area of the electronic device (e.g., the electronic device 200 of FIG. 2). The support part 310 of the connector module 300 may be fixedly coupled to the seating recess 216, and the link part 320 of the connector module 300 may be coupled to the support part 310 to be rotatable.

Referring to FIG. 5A, the link part 320 may be rotated clockwise or counterclockwise about the central axis O formed by the coupling protrusions 323 coupled to the coupling portion 312 of the support part 310. For example, when viewed from the lengthwise direction (e.g., the sixth direction (−X)) of the electronic device 200, the rotational portion 321 of the link part 320 may be rotated clockwise at a predetermined angle. The first pole 3211a disposed at a lower end of the link part 320 may be moved toward the third direction (+Y), and the second pole 3211b disposed at an upper end of the link part 320 may be moved toward the fourth direction (−Y).

According to various embodiments, the rotation of the link part 320 may be restricted from being inclined to a predetermined angle or more by the stopper 314 of the support part 310. The stopper 314 of the support part 310 may include an inclined surface having an inclination that decreases toward the inside of the electronic device 200, and may stop motion of the link part 320 that is rotated clockwise or counterclockwise while contacting the inclined surface. A step 324 that protrudes in the same direction of the coupling protrusions 323 may be disposed in the plurality of plates 3213 of the link part 320, and may contact the inclined surface of the stopper 314 to stop movement of the link part 320.

According to various embodiments, the elastic member 330 may be disposed between the support part 310 and the plurality of plates 3213 in a state in which the elastic member 330 is fitted with the first coupling protrusion 323a of the coupling protrusions 323 of the link part 320 and may consistently provide a force that rotates the link part 320 in a direction that is opposite to the inclination by an elastic restoring force. For example, when viewed from the lengthwise direction (e.g., the sixth direction (−X)) of the electronic device 200, the elastic restoring force may be a force that is provided counterclockwise.

Referring to FIG. 5B, the link part 320 may be rotated clockwise or counterclockwise about the central axis O formed by the coupling protrusions 323 coupled to the coupling portion 312 of the support part 310 when the force applied to the link part 320 is removed. For example, when viewed from the lengthwise direction (e.g., the sixth direction (−X)) of the electronic device 200, the rotational portion 321 of the link part 320 may be rotated counterclockwise at a predetermined angle. The first pole 3211a disposed at a lower end of the link part 320 may be moved toward the fourth direction (−Y), and the second pole 3211b disposed at an upper end of the link part 320 may be moved toward the third direction (+Y).

According to an embodiment, the link part 320 may be rotated by an opposite rotation distance by FIG. 5A and may return to the original position. The restored inclination of the link part 320 may be set through coupling of the elastic member 330 and the support part 310, and may be maintained at approximately 30 to 60 degrees with respect to one surface of the electronic device. The cable 340 disposed in the link part 320 by the predetermined angle may be accommodated at a maximum length while being curved and having no contact therebetween. However, the rotation angle and the rotation direction of the link part 320 are not limited thereto, and designs may be changed variously according to the variable length of the cable and a setting by a user.

According to various embodiments, the elastic member 330 may be disposed between the support part 310 and the plurality of plates 3213 in a state in which the elastic member 330 is fitted with the first coupling protrusion 323a of the coupling protrusions 323 of the link part 320 and may provide an elastic restoring force such that the link part 320 may be rotated and the cable 340 disposed in the interior of the link part 320 may be automatically wound. When viewed from the lengthwise direction (e.g., the sixth direction (−X)) of the electronic device 200, the elastic member 330 may apply an elastic restoring fore that rotates the link part 320 rotated clockwise in a counterclockwise direction in FIG. 5A, and may consistently provide a force that maintains the state of the restored link part 320 in FIG. 5B.

Figure 6A:
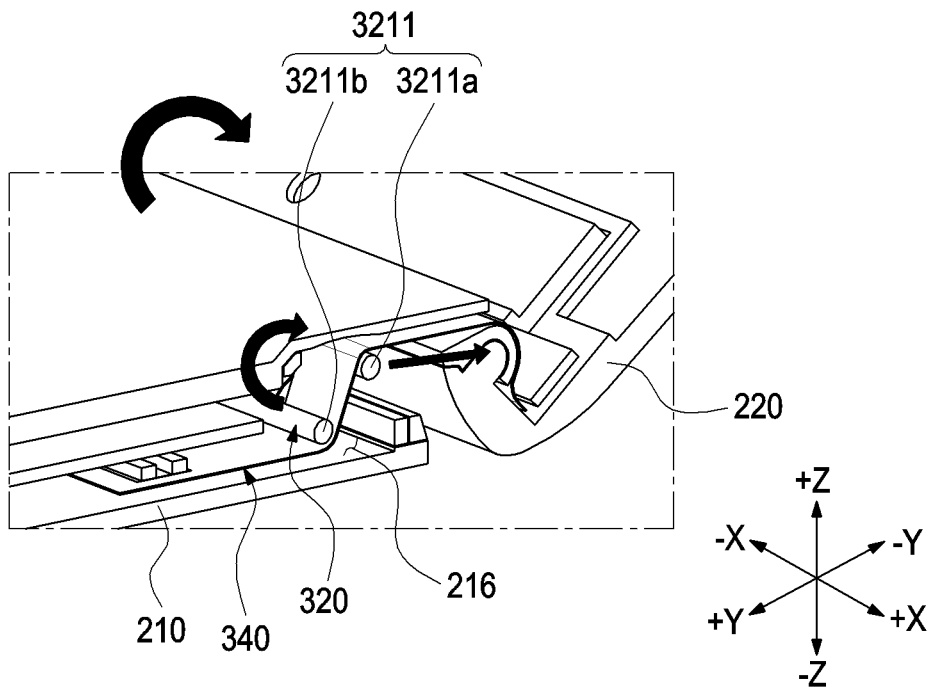
FIG. 6A illustrates a cable 340 that is unfolded in correspondence to the link part 320 that is rotated in a direction to which a force is applied.
Figure 6B:
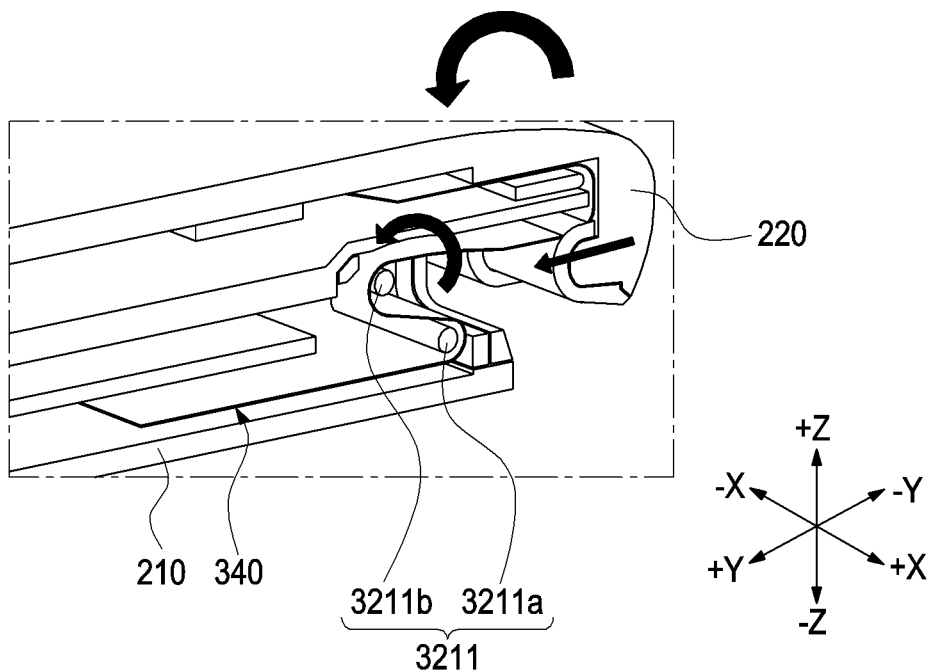
FIG. 6B illustrates the cable 340 that is folded in correspondence to the link part 320 that is restored to an original position in a state in which the force is removed.

According to various embodiments of the disclosure, FIGS. 6A and 6B are views illustrating operational states of the connector module 300 disposed in the electronic device (e.g., the electronic device 200 of FIG. 2). FIG. 6A illustrates a cable 340 that is unfolded in correspondence to the link part 320 that is rotated in a direction to which a force is applied, and FIG. 6B illustrates the cable that is unfolded in correspondence to the link part 320 that is restored to an original position in a state in which the force is removed.

Figure 7A:
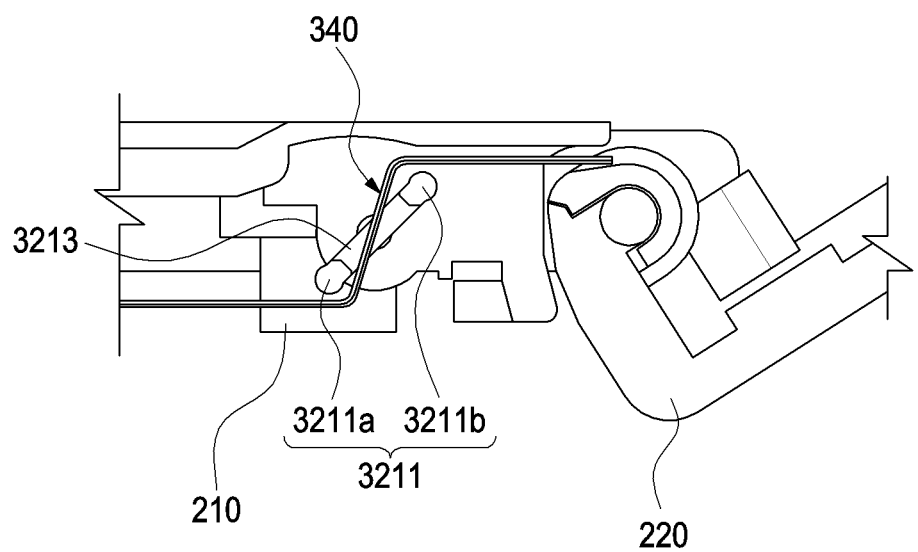
FIG. 7A is a cross-sectional view of FIG. 6A.
Figure 7B:
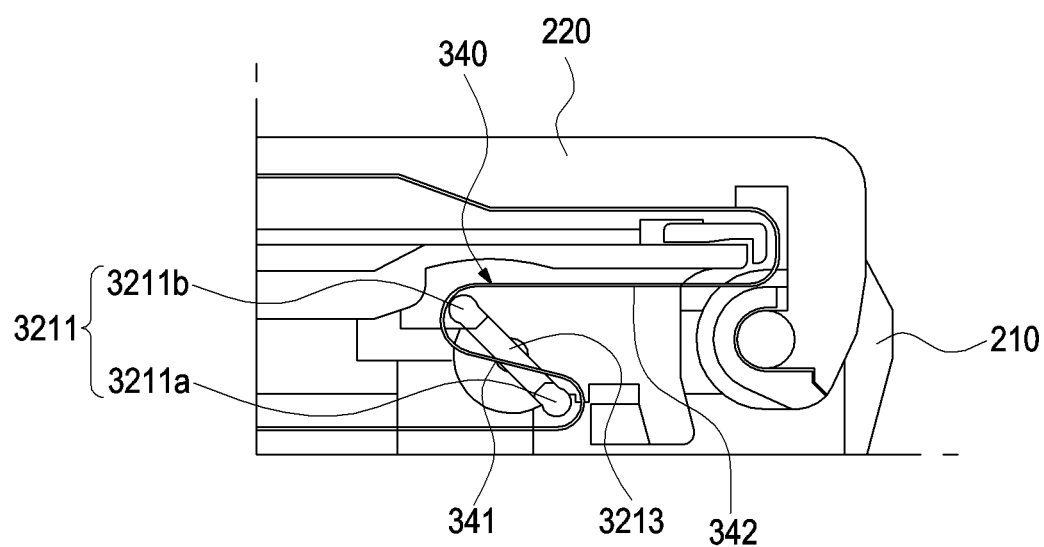
FIG. 7B is a cross-sectional view of FIG. 6B.

FIG. 7A is a cross-sectional view of FIG. 6A, and FIG. 7B is a cross-sectional view of FIG. 6B.

Referring to FIGS. 6A and 7B, the connector module 300 may include a support part 310, a link part 320, an elastic member 330, and at least one cable 340. The support part 310, the link part 320, the elastic member 330, and the cable 340 of FIGS. 6A and 7B may be partially or entirely the same as the support part 310, the link part 320, the elastic member 330, and the cable 340 of FIGS. 3 and 4.

In FIGS. 6A and 7A, 'X' of a 3-axis Cartesian coordinate system may denote the lengthwise direction of the body part 210, 'Y' may denote the widthwise direction of the body part 210, and 'Z' may denote the thickness direction of the body part 210. In an embodiment of the disclosure, 'Z' may denote a first direction (+Z) and a second direction (−Z), 'Y' may denote a third direction (+Y) and a fourth direction (−Y), and 'X' may denote a fifth direction (+X) and a sixth direction (−X).

According to various embodiments, the connector module 300 may be disposed in the seating recess 216 disposed at a peripheral area of the electronic device 200. The support part 310 of the connector module 300 may be fixedly coupled to the seating recess 216, and the link part 320 of the connector module 300 may be coupled to the support part 310 to be rotatable. The cable 340 may pass through the link part 320 from the body part 210 and extend to the display part 220.

As the body part 210 and the display part 220 are rotated about different axes of rotation, the display part 220 may be rotated between 0 to 180 degrees with respect to the body part 210. For convenience of description, the angle that represents 0 to 180 degrees may be defined as the angle of the display part 220 with respect to the body part 210. In the specification, a first state is defined as the angle between the body part 210 and the display part 220 being 0 to 180 degrees and a second state is defined as the angle between the body part 210 and the display part 220 being 0 degrees.

For example, the state of FIGS. 6A and 7A may be defined as the first state. As illustrated in FIGS. 6A and 7A, the angle between the body part 210 and the display part 220 represents 0 to 180 degrees, and accordingly, the link 320 of the connector module 300 represents a predetermined inclination from one surface of the body part 210.

According to various embodiments, the angle of the display part 220 with respect to the body part 210 may be approximately 135 degrees. A user may use the electronic device 200 in the first state. For example, in the first state, an application such as writing of documents may be driven in a state in which the body part 210 of the electronic device 200 is held on a lap of the user or a desk, and the display part 220 is a display device and may be realized as an input device as the body part 210 is driven.

According to various embodiments, a rotational force that interworks with the link part 320 is applied while the display part 220 is rotated, and the link part 320 may have an inclination of approximately 30 to 60 degrees with respect to one surface of the body part 210.

The link part 320 may include two spaced the plurality of poles 3211 and the plurality of plates 3213 connecting the plurality of poles 3211, and may be rotated clockwise or counterclockwise about the coupling protrusions 323 located at the centers of the plurality of plates 3213. The link part 320 may be rotated in the same direction as the rotational direction of the display part 220. The link part 320 may be set not to be inclined at a predetermined angle or more by the stopper 314 of the support part 310.

According to various embodiments, the cable 340 may pass through the opening 322 via the second pole 3211b disposed at a lower end of the link part 320 and may extend to the display part 220 via the first pole 3211a disposed at an upper end of the link part 320.

According to various embodiments, as the display part 220 is rotated, the marginal length part of the cable 340 accommodated in the accommodation space 217 may be gradually flattened as it is reflected on the spacing distance of the body part 210 and the display part 220. For example, as the link part 320 is rotated before a portion of the link part 320 contacts the stopper 314, the cable 340 that interworks with the link part 320 may be unfolded sequentially. At the moment at which at least a portion of the link part 320 contacts the stopper 314, the cable 340 may be fully unfolded, and the rotation of the link part 320 may be stopped.

According to various embodiments, the inclination of the cable 340 may be smaller than the inclination, by which the link 320 is rotated. The cable 340 passes through the opening 322 disposed on the inside of the link part 320, whereby the angle formed by the cable 340 and one surface of the electronic device 200 may be smaller than the angle formed by the link part 320 and one surface of the electronic device 200, and the surface on which the cable 340 contacts the link part 320 may be different. For example, when the first surface 341 that faces the front surface of the cable 340 is disposed to contact the first pole 3211a, the second surface 342 that faces a direction that is opposite to the first surface 341 of the cable 340 may be disposed to contact the second pole 3211b.

According to various embodiments, the elastic member 330 may be disposed between the support part 310 and the plurality of plates 3213 in a state in which the elastic member 330 is fitted with the first coupling protrusion 323a of the the coupling protrusions 323 of the link part 320 and may consistently provide a force that rotates the link part 320 in a direction that is opposite to the inclination by an elastic restoring force.

As another embodiment, the state of FIGS. 6B and 7B may be defined as the second state. As illustrated in FIGS. 6B and 7B, the angle between the body part 210 and the display part 220 represents 0 degrees, and accordingly, the link 320 of the connector module 300 represents a predetermined inclination from one surface of the body part 210.

According to various embodiments, the angle of the display part 220 with respect to the body part 210 may be 0 degrees. For example, in the second state, the user may carry the electronic device 200 or move. As another example, in order to save a space occupied by the electronic device 200, the second state may be maintained at times other than the time for driving of the electronic device 200. The one surface of the body part 210 and the one surface of the display part 220 may be disposed to face each other.

According to various embodiments, a rotational force that interworks with the link part 320 is applied while the display part 220 is rotated in a direction that is opposite to the first state, and the link part 320 may have an inclination of approximately −30 to −60 degrees with respect to one surface of the body part 210.

The link part 320 may include two spaced the plurality of poles 3211 and the plurality of plates 3213 connecting the plurality of poles 3211, and may be rotated clockwise or counterclockwise about the coupling protrusions 323 located at the centers of the plurality of poles 3211. The link part 320 may be rotated in the same direction as the rotational direction of the display part 220. The link part 320 may be set not to be inclined at a predetermined angle or more by the elastic member 330 disposed between the support part 310 and the link part 320.

According to various embodiments, the cable 340 may pass through the opening 322 via the second pole 3211b disposed at a lower end of the link part 320 and may extend to the display part 220 via the first pole 3211a disposed at an upper end of the link part 320.

According to various embodiments, as the display part 220 is rotated, the marginal length part is formed in the cable 340, and the marginal length part may be accommodated in the accommodation space 217 on the inside of the support part 310. The marginal length part is gradually folded and accommodated as the spacing distance between the body part 210 and the display part 220 decreases. For example, as the link part 320 is rotated by the elastic restoring force of the elastic member 330, the cable 340 that interworks with the link part 320 may be sequentially folded, and the variable area (e.g., the variable area S3 of FIG. 3) of the cable 340 may be disposed to have an "S" shape that is smooth as a whole. When viewed from the upper side of the electronic device 200 (e.g., toward the second direction (−Z)), at least partial areas of the marginal cable may overlap each other. As the marginal length parts contact each other in the accommodation space 217 of the connector module 300 or are accommodated while not being wrinkled, a damage such as a crack or a short-circuit can be prevented whereby the reliability of the electrical connection may be provided. Further, as the marginal length part is accommodated in the minimum space of the electronic device 200, the electronic device 200 can be slimmed and miniaturized.

According to various embodiments, the elastic member 330 may be disposed between the support part 310 and the plurality of plates 3213 in a state in which the elastic member 330 is fitted with the first coupling protrusion 323a of the coupling protrusions 323 of the link part 320 and may consistently provide a force that maintains the current state.

An electronic device (e.g., the electronic device 200 of FIG. 2) according to various embodiments of the disclosure may include: a body part (e.g., the body part 210 of FIG. 2) including a first surface facing a first direction and a second surface facing a second direction that is opposite to the first direction, and including a seating recess (e.g., the seating recess 216 of FIG. 3) disposed in an inner peripheral area in a lengthwise direction thereof; a display part (e.g., the display part 220 of FIG. 2) coupled to the body part to be rotatable; and a connector module (e.g., the connector module 300 of FIG. 3) disposed in the seating recess of the body part and electrically coupling the body part and the display part, wherein the connector module includes: a support part (e.g., the support part 310 of FIG. 3) fixedly coupled to an inside of the seating recess and including an opening (e.g., the opening 313 of FIG. 3) disposed on the inside thereof; a link part (e.g., the link part 320 of FIG. 3) coupled to the support part and a central area of which is opened to correspond to the opening of the support part; at least one elastic member (e.g., the elastic member 330 of FIG. 3) disposed between the support part and the link part and configured to provide an elastic restoring force as the link part is rotated; and at least one cable (e.g., the cable 340 of FIG. 3) passing from the body part through the opening of the link part to be connected to the display part and configured to be folded or unfolded as the link part is rotated.

According to various embodiments, the at least one cable may include a flexible printed circuit board, and connectors are disposed at both ends of the at least one cable to be electrically connected to the body part and the display part.

According to various embodiments, the at least one cable may include: a first area (e.g., the first area S1 of FIG. 3) connected to the body part; a second area (e.g., the second area S2 of FIG. 3) connected to the display part; and a variable area (e.g., the variable area of FIG. 3) disposed between the first area and the second area and the shape of which varies in an accommodation space formed by the seating recess and the support part, and wherein the variable area is configured to be unfolded by a pulling force of the display part as the display part is rotated with respect to the body part.

According to various embodiments, the electronic device may include: a first state in which the at least one cable is unfolded as the display part is rotated with respect to the body part; and a second state in which the body part and the display part are disposed to face each other and the at least one cable is maintained in a folded state, wherein the length by which the variable area is mounted in the accommodation space is different in the first state and the second state.

In the second state, at least a portion of the variable area of the folded cable may not contact other portions thereof.

According to various embodiments, the support part (e.g., the support part (e.g., 310 of FIG. 3) may further include: a support portion (e.g., the support portion 311 of FIG. 3) seated in the seating recess and defining surfaces that are perpendicular to each other; coupling portions (e.g., the coupling portions 312 of FIG. 3) disposed at both ends of the support portion and coupled to the link part to be rotatable; and an opening (e.g., the opening 313 of FIG. 3) surrounded by the support portion.

According to various embodiments, the support part may further include a stopper (e.g., the stopper 314 of FIG. 3) disposed to be adjacent to the coupling portion and forming an inclined surface that is inclined toward the inside of the electronic device to restrict rotation of the link part.

According to various embodiments, the link part (e.g., the link part 320 of FIG. 3) may include: a rotational portion (e.g., the rotational portion 321 of FIG. 3) configured to contact at least a portion of the at least one cable and rotate in the accommodation space; the opening (e.g., the opening 322 of FIG. 3) disposed inside the rotational portion; and a plurality of coupling protrusions (e.g., the coupling protrusions 323 of FIG. 3) protruding from both ends of the rotational portion.

According to various embodiments, at least a portion of the at least one cable may be wound on the rotational portion of the link part, and may include a plurality of poles disposed in parallel to each other; and a plurality of plates extending from both ends of the plurality of poles and connecting the plurality of poles each other to support the plurality of poles such that the plurality of poles are rotated in the same direction and at the same radius.

According to various embodiments, the plurality of poles may include a first pole (e.g., the first pole 3211a of FIG. 3) and a second pole (e.g., the second pole 3211b of FIG. 3) disposed to be spaced apart from the first pole, and a surface on which the first pole and the cable contact each other may be different from a surface on which the second pole and the cable contact each other.

According to various embodiments, the plurality of coupling protrusions of the link part may have cylindrical shapes, and are inserted into or press-fitted with the coupling portion of the support part to provide rotation of the link part, and the centers of the plurality of coupling protrusions may be located on the same line and provide the center axes, about which the link part is rotated.

According to various embodiments, the link part may include a step protruding in an outward direction of at least one of the plurality of plates, and when the step contacts the inclined surface of the stopper of the support part, the rotation of the link part may be restricted.

According to various embodiments, the connector module comprises a plurality of cables, the plurality of cables may be disposed to be spaced apart from each other, and at least one of the plurality of cables may connected to an antenna.

According to various embodiments, in the first state, an angle formed by the link part with respect to one surface of the body part may be smaller than an angle formed by a partial area of the cable passing through the link part with respect to one surface of the body part.

According to various embodiments, the elastic member may be disposed in a recess area formed on one side of the coupling portion of the support part in a state in which the elastic member is press-fitted with the plurality of coupling protrusions of the link part.

According to various embodiments, in the first state, the body part may include an input device exposed to the first surface, and the display part may include a display device exposed to the outside.

According to various embodiments, a connector module (e.g., the connector module 300 of FIG. 3) that provides electrical coupling of a body part and a display part of an electronic device according to various embodiments of the disclosure may include: a support part (e.g., the support part 310 of FIG. 3) seated in a seating recess recessed on the inside of the body part; a link part (e.g., the link part 320 of FIG. 3) coupled to the support part and a central area of which is opened to correspond to the opening of the support part; at least one elastic member (e.g., the elastic member 330 of FIG. 3) disposed between the support part and the link part and configured to provide an elastic restoring force as the link part is rotated; and at least one cable (e.g., the cable 340 of FIG. 3) passing from the body part through the opening of the link part to be connected to the display part and folded or unfolded as the link part is rotated, wherein the link part includes a first pole (e.g., the first pole 3211a of FIG. 3), a second pole (e.g., the second pole 3211b of FIG. 3) disposed to be spaced apart from the first pole, and the opening between the first pole and the second pole, and the at least one cable passes by an upper side of the first pole to pass through the opening and passes by a lower side of the second pole to extend.

According to various embodiments, the at least one cable may include a flexible printed circuit board, and the rotational direction of the link part with respect to the support part may be the same as the rotational direction of the display part with respect to the body part.

According to various embodiments, the support part may include: a support portion fixedly coupled to the recess and defining surfaces that are perpendicular to each other; coupling portions disposed at both ends of the support portion and coupled to the link part to be rotatable; an opening surrounded by the support portion; and a stopper disposed to be adjacent to the coupling portion and forming an inclined surface that is inclined toward the inside of the electronic device to restrict rotation of the link part, According to various embodiments, the link part may include: a rotational portion configured to contact at least a portion of the at least one cable and rotate in an inner space of the support part; the opening disposed inside the rotational portion; and a plurality of coupling protrusions protruding from both ends of the rotational portion.

According to various embodiments, the plurality of coupling protrusions of the link part may have cylindrical shapes, and are inserted into or press-fitted with the coupling portion of the support part to provide rotation of the link part, and the centers of the plurality of coupling protrusions may be located on the same line and provide the center axes, about which the link part is rotated.

It will be apparent to those skilled in the art that the above-described electronic device according to various embodiments of the disclosure is not limited by the above embodiments and the drawings, and various alternatives, modifications, and changes may be made thereto without departing from the scope of the disclosure.

The invention claimed is:

1. An electronic device comprising:
   a body part comprising a first surface facing a first direction and a second surface facing a second direction that is opposite to the first direction, and comprising a seating recess disposed in an inner peripheral area in a lengthwise direction thereof;
   a display part coupled to the body part to be rotatable; and
   a connector module disposed in the seating recess of the body part and electrically coupling the body part and the display part,
   wherein the connector module comprises:
   a support part fixedly coupled to an inside of the seating recess and comprising an opening disposed on the inside thereof;
   a link part coupled to the support part to be rotatable and a central area of which is opened to correspond to the opening of the support part;
   at least one elastic member disposed between the support part and the link part and configured to provide an elastic restoring force as the link part is rotated; and
   at least one cable passing from the body part through the opening of the link part to be connected to the display part and configured to be folded or unfolded as the link part is rotated.

2. The electronic device of claim 1, wherein the at least one cable comprises a flexible printed circuit board, and connectors are disposed at both ends of the at least one cable to be electrically connected to the body part and the display part.

3. The electronic device of claim 1, wherein the at least one cable comprises:
   a first area connected to the body part;
   a second area connected to the display part; and
   a variable area disposed between the first area and the second area and the shape of which varies in an accommodation space formed by the seating recess and the support part, and
   wherein the variable area is configured to be unfolded by a pulling force of the display part as the display part is rotated with respect to the body part.

4. The electronic device of claim 3, wherein the electronic device comprises:
   a first state in which the at least one cable is unfolded as the display part is rotated with respect to the body part; and
   a second state in which the body part and the display part are disposed to face each other and the at least one cable is maintained in a folded state,
   wherein the length by which the variable area is mounted in the accommodation space is different in the first state and the second state, and
   wherein in the second state, at least a portion of the variable area of the folded cable does not contact other portions thereof.

5. The electronic device of claim 1, wherein the support part further comprises:
   a support portion seated in the seating recess and defining surfaces that are perpendicular to each other;
   coupling portions disposed at both ends of the support portion and coupled to the link part to be rotatable;
   an opening surrounded by the support portion; and
   a stopper disposed to be adjacent to the coupling portion and forming an inclined surface that is inclined toward the inside of the electronic device to restrict rotation of the link part.

6. The electronic device of claim 3, wherein the link part comprises:
   a rotational portion configured to contact at least a portion of the at least one cable and rotate in the accommodation space;
   the opening disposed inside the rotational portion; and
   a plurality of coupling bosses protruding from both ends of the rotational portion,
   wherein at least a portion of the at least one cable is wound on the rotational portion, and
   a plurality of poles disposed in parallel to each other; and
   a plurality of plates extending from both ends of the plurality of poles and connecting the plurality of poles each other to support the plurality of poles such that the plurality of poles are rotated in the same direction and at the same radius.

7. The electronic device of claim 6, wherein the plurality of poles comprise a first pole and a second pole disposed to be spaced apart from the first pole, and a surface on which the first pole and the cable contact each other is different from a surface on which the second pole and the cable contact each other.

8. The electronic device of claim 6, wherein the plurality of coupling protrusions have cylindrical shapes, and are inserted into or press-fitted with the coupling portion of the support part to provide rotation of the link part, and
   wherein the centers of the plurality of coupling protrusions are located on the same line and provide the center axes, about which the link part is rotated.

9. The electronic device of claim 6, wherein the link part comprises a step protruding in an outward direction of at least one of the plurality of plates, and
wherein when the step contacts the inclined surface of the stopper of the support part, the rotation of the link part is restricted.

10. The electronic device of claim 1, wherein the connector module comprises a plurality of cables, the plurality of cables are disposed to be spaced apart from each other, and at least one of the plurality of cables is connected to an antenna.

11. The electronic device of claim 4, wherein in the first state, an angle formed by the link part with respect to one surface of the body part is smaller than an angle formed by a partial area of the cable passing through the link part with respect to one surface of the body part.

12. The electronic device of claim 6, wherein the elastic member is disposed in a recess area formed on one side of the coupling portion of the support part in a state in which the elastic member is press-fitted with the plurality of coupling protrusions of the link part.

13. The electronic device of claim 4, wherein in the first state, the body part comprises an input device exposed to the first surface, and the display part comprises a display device exposed to the outside.

14. A connector module that provides electrical coupling of a body part and a display part of an electronic device, the connector module comprising:
a support part seated in a seating recess recessed on the inside of the body part;
a link part coupled to the support part to be rotatable and a central area of which is opened to correspond to the opening of the support part;
at least one elastic member disposed between the support part and the link part and configured to provide an elastic restoring force as the link part is rotated; and
at least one cable passing from the body part through the opening of the link part to be connected to the display part and folded or unfolded as the link part is rotated,
wherein the link part comprises a first pole, a second pole disposed to be spaced apart from the first pole, and the opening between the first pole and the second pole, and
wherein the at least one cable passes by an upper side of the first pole to pass through the opening and passes by a lower side of the second pole to extend.

15. The connector module of claim 14, wherein the support part comprises:
a support portion fixedly coupled to the recess and defining surfaces that are perpendicular to each other;
coupling portions disposed at both ends of the support portion and coupled to the link part to be rotatable;
an opening surrounded by the support portion; and
a stopper disposed to be adjacent to the coupling portion and forming an inclined surface that is inclined toward the inside of the electronic device to restrict rotation of the link part,
wherein the link part comprises:
a rotational portion configured to contact at least a portion of the at least one cable and rotate in an inner space of the support part;
the opening disposed inside the rotational portion; and
a plurality of coupling protrusions protruding from both ends of the rotational portion,
wherein the plurality of coupling protrusions have cylindrical shapes, and are inserted into or press-fitted with the coupling portion of the support part to provide rotation of the link part, and
wherein the centers of the plurality of coupling protrusions are located on the same line and provide the center axes, about which the link part is rotated.

* * * * *